United States Patent [19]

Nishioka et al.

[11] Patent Number: 5,225,127
[45] Date of Patent: Jul. 6, 1993

[54] PROCESS FOR PRODUCTION OF SINTERED SILICON NITRIDE MADE ARTICLE

[75] Inventors: Takao Nishioka; Yoshishige Takano; Kenji Matsunuma; Matsuo Higuchi; Masaya Miyake, all of Itami, Japan

[73] Assignee: Sumitomo Electric Industries, Ltd., Osaka, Japan

[21] Appl. No.: 829,571

[22] Filed: Feb. 3, 1992

Related U.S. Application Data

[63] Continuation of Ser. No. 553,801, Jul. 18, 1990, abandoned.

[30] Foreign Application Priority Data

Jul. 18, 1989 [JP] Japan .................. 1-186524
Jun. 18, 1990 [JP] Japan .................. 2-160689

[51] Int. Cl.⁵ .................................... C04B 35/58
[52] U.S. Cl. ........................... 264/65; 264/66
[58] Field of Search ........................... 264/65, 66

[56] References Cited

U.S. PATENT DOCUMENTS 3,853,973 12/1974 Härdtl .................. 264/65
4,119,475 10/1978 Prochazka .................. 501/97
4,119,690 10/1978 Prochazka .................. 264/65

FOREIGN PATENT DOCUMENTS 0080711 6/1983 European Pat. Off. .
0107919 5/1984 European Pat. Off. .
3141590 6/1982 Fed. Rep. of Germany ........ 264/66
2376090 7/1978 France .

OTHER PUBLICATIONS

M. Mitomo et al., "Sintering Behavior of $Si_3N_4$ with $Y_2O_3$ and $Al_2O_3$ Addition," *J. Ceramic Assoc. Japan*, vol. 94, No. 1, 1986, pp. 106-111, 108.

*Primary Examiner*—James Derrington
*Attorney, Agent, or Firm*—Cushman, Darby & Cushman

[57] ABSTRACT

There is provided a process for the production of a sintered article which comprises steps of
  shaping a raw material powder comprising silicon nitride,
  thermally treating a shaped article in a non-oxidizing atmosphere at a temperature of 1300° to 1650° C. for at least 2 hours to form β-silicon nitride of not less than 85% calculated from X-ray diffraction patterns and to increase a relative density of the article to not less than 80%, preferably to 80 to 85 %, and
  sintering the thermally treated article at a temperature of 1700° to 2000° C.

2 Claims, 1 Drawing Sheet

PROCESS FOR PRODUCTION OF SINTERED SILICON NITRIDE MADE ARTICLE

This is a continuation of application Ser. No. 07/553,801 filed on Jul. 18, 1990 now abandoned.

BACKGROUND OF THE INVENTION

1. Field of the Invention

The present invention relates to a process for the production of a sintered silicon nitride made article having a high strength.

2. Description of the Related Art

Generally, strength of a ceramic material depends on, for example, a porosity ratio, a particle size and a surface condition of a crystal. Such factors affect strength of a sintered article made of silicon nitride which is one of important ceramic materials used for structural members.

In order to increase the strength of a $Si_3N_4$ based sintered article, sintering aids and sintering processes have been developed. For example, Am. Ceram. Soc. Bull., 52, 560, (1973) reports that a bending strength of up to 100 Kg/mm$^2$ with the use of a hot press sintering, and Preprint for the 1981 Annual Conference of the Ceramic Association of Japan, 178 (1981) reports that the same strength as above with the use of a low pressure sintering. In each case, the strength is increased by extremely reducing the porosity.

Japanese Patent Kokoku Publication Nos. 21091/1974 and 38448/1973 describe a process for the production of the silicon nitride made sintered article based on $Si_3N_4$—$Y_2O_3$—$Al_2O_3$ in which $Y_2O_3$ is used as a main sintering aid.

As described in these Publications, it may be contemplated thought that the strength and toughness of the ceramic material are increased since $Si_3N_4$ in a $\beta$-crystal lattice is present in a fibrous structure and dispersed in a matrix phase. Namely, the lattice of $\beta$-crystal is a hexagonal one, and an anisotropical crystal growth along C axis is effectively used. A fibrous particle of $\beta$-$Si_3N_4$ crystal may grow to more than ten and few microns along a longitudinal axis as described in Japanese Patent Kokoku Publication No. 38448/1973 and J. Ceram. Ass. Jpn., 94, 96 (1986).

Since the growth of the fibrous structure is required in the prior arts as described above, abnormal growth of the crystal particles and generation of pores in relation to such growth may arise. Thus, this growth is not necessarily effective to increase the strength of the ceramic material.

In addition, in the case where the hot press sintering is used in order to form the fibrous structure as described in Japanese Patent Kokoku Publication No. 21091/1974 or where a raw material of the $\beta$-crystal of $Si_3N_4$ which has been thermally treated for the fibrous structure growth is added, the increase of the strength cannot be expected.

SUMMARY OF THE INVENTION

It is an object of the present invention to provide a silicon nitride made article having a high mechanical strength which overcomes the problems as described above.

It is found that a sintered article comprising a matrix phase of uniform and fine $\beta$-crystal particles having a high aspect ratio is stronger than the fiber reinforced sintered article which is produced by dispersing the long fibrous crystal in the matrix as described above.

Accordingly, the present invention provide a process for the production of a sintered article which comprises steps of shaping a raw material powder comprising silicon nitride, thermally treating a shaped article in a non-oxidizing atmosphere at a temperature of 1300° to 1650° C. for at least 2 hours to form $\beta$-silicon nitride of not less than 85% calculated from X-ray diffraction patterns according to the following equation:

$$\frac{I_\beta(101) + I_\beta(210)}{I_\alpha(102) + I_\alpha(210) + I_\beta(101) + I_\beta(210)} \times 100 \qquad (I)$$

wherein I indicates an integral area of each crystalline phase peak for $\alpha$- and $\beta$-silicon nitride and to increase a relative density of the article to not less than 80%, preferably to 80 to 85%, and sintering the thermally treated article at a temperature of 1700° to 2000° C.

The article produced by the present process has a high mechanical strength and overcomes the problems as described above.

The present invention includes following preferred embodiments:

(1) The process in which the raw material comprises $Si_3N_4$ powder having an average particle size of not more than 0.8 μm and a particle size distribution (3σ) of not more than 0.4 μm;

(2) The process in which the sintered article contains $\beta$-silicon nitride particles of not less than 15% by volume relative to all of $\beta$-silicon nitride which has a major axis size of not more than 5 μm and an aspect ratio of not less than 5;

(3) The process in which the non-oxidizing atmosphere is in combination of a nitrogen atmosphere under a pressure of 1 to 100 atms at a temperature of 1300° to 1500° C., a nitrogen atmosphere under a pressure of 100 torrs to 10 atms at a temperature of 1450° to 1600° C. and a nitrogen atmosphere under a pressure of 1 to 2000 atms at a temperature higher than 1600° C.; and (4) The process in which the raw material of silicon nitride power is produced by the imide decomposition method.

DETAILED DESCRIPTION OF THE INVENTION

Figure 1:
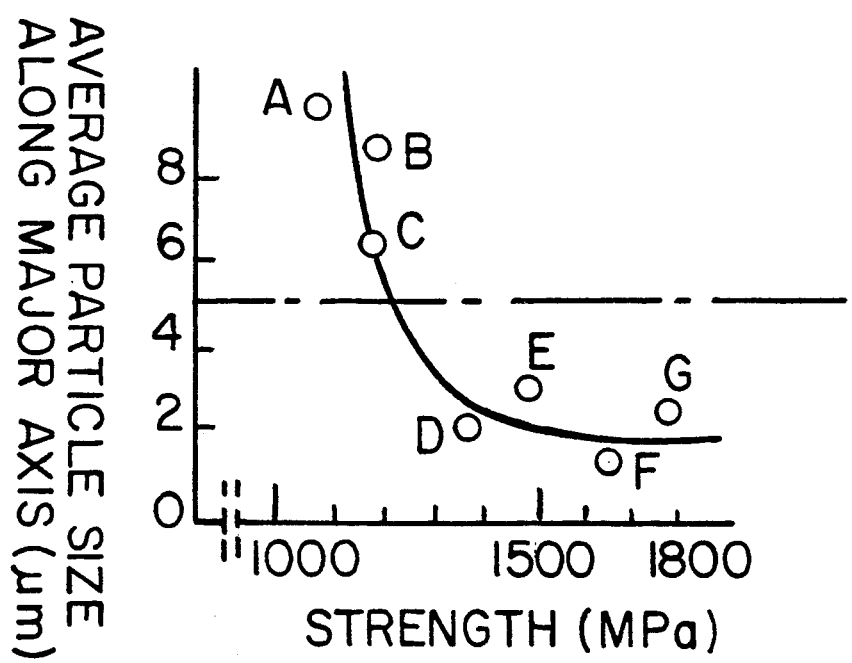
FIG. 1 is a graph showing a relation between an average size of a crystal particle along a major axis of the crystal particle and a strength of the sintered article produced by the present process.

The present invention will be hereinafter explained in detail.

In the sintering of silicon nitride, a densification is generally thought to proceed as follows; generation of a liquid phase by the addition of a sintering aid into $\alpha$-silicon nitride powder, dissolution of densified $\alpha$-silicon nitride into the liquid phase by re-arrangement of atoms due to the generation of the liquid phase, nucleus generation of β-silicon nitride by transformation from α to β, and densification by growth of β-silicon nitride.

It is found that, by the thermal treatment at a temperature of 1300° to 1650° C. at which the transformation from α to β occurs for at least 2 hours to form β-silicon nitride of not more than 85%, which is calculated according to the equation (I), relative to α- and β-silicon nitride crystalline phases and to increase the relative density of the treated article to not less than 80%, preferably to 80 to 85%, the sintered article comprising a matrix of the uniform and fine β-silicon nitride particles having a high aspect ratio, that is, the sintered article having a high strength, is produced.

The transformation from α to β does not proceed sufficiently in the thermal treatment at a temperature of lower than 1300 ° C. The transformation from α to β proceeds so rapidly in the thermal treatment at a temperature of higher than 1650 ° C. that the size of the generated silicon nitride particles scatters, whereby the uniform and fine structure cannot be formed.

When a ratio of the formed β-silicon nitride is less than 85% which is calculated according to the equation (I), the transformation from α to β proceeds at the higher temperature after the thermal treatment, whereby ununiform particles tend to be produced. When the relative density is not more than 80%, the β-silicon nitride tends to grow along its major axis during the sintering step after the thermal treatment, whereby the major axis size of the crystal unpreferably becomes more than 5 $\mu$m.

In order to generate the nuclei of the β-silicon nitride having the anisotropy, components of the liquid phase and an atmosphere surrounding the liquid phase are important at a temperature of 1300° to 1500° C. at which the liquid phase is formed by a reaction between an added sintering aid powder and an oxide or an oxynitride such as $SiO_2$ or $Si_2N_2O$ mainly present on surfaces of the $Si_3N_4$ raw powder particles. Namely, when an amount of dissolved Si or N in the liquid phase is increased, an amount of the generated nuclei of the anisotropical crystal is increased. Thus, in order to increase an amount of the dissolved $SiO_2$ or $Si_2N_2O$, following manners may be used.

Generally, the finer the raw powder of $Si_3N_4$ is, the more the oxidized amount of its surface is. However, it is not preferable that the particle size distribution and the average particle size of the raw powder are remarkably deviated from the ranges as described above. Thus, in order to control the transformation from α to β effectively, in addition to the average particle size of not more than 0.8 $\mu$m and the particle size distribution (3$\sigma$) of not more than 0.4 $\mu$m, a specific surface area of the raw powder is preferably in the range of 10 to 18 $m^2/g$ when measured by BET and/or the an amount of surface oxygen is preferably in the range of 1.5 to 2.5% by weight relative to total weight of the raw powder. For the control of the amount of the surface oxygen, the surface of the powder may be beforehand oxidized in the air at a temperature of up to 800° C. for 2 to 5 hours. Alternatively, a synthesized $Si_2N_2O$ powder may be separately added.

With respect to the atmosphere during the thermal treatment, increase of a nitrogen partial pressure is effective during the initial period of the treatment when the liquid phase is generated and the transformation from α to β is initiated, that is, when the atmosphere is at a temperature of 1300° to 1500° C. The nitrogen partial pressure is preferably in the range of 1 to 100 atms. When the pressure is less than 1 atm, the effect as described above is insufficiently achieved, and when more than 100 atms, pores may be generated in the initial period of the sintering step. In addition, it is practically more preferred to continuously renew the nitrogen gas by supplying a fresh nitrogen gas as a carrier during the sintering step. The effect achieved by the renewal of the nitrogen gas depends on a partial pressure of oxygen therein. Thus, the oxygen content in the supplied nitrogen gas is preferably not more than 100 ppm.

The initial period of the crystal transformation from α to β has been described and the latter period of the crystal transformation will be hereinafter described.

The latter period of the crystal formation is intended to mean a period during which a crystal ratio defined as $\beta/(\alpha+\beta)$ according to the equation (I) is in the range of 50 to 100% and the temperature is in the range of 1450° to 1650° C. The crystal ratio is determined by usual X-ray diffractometory. In the latter period, the crystal nuclei generated during the initial period uniformly grow to be more anisotropical, that is, to have the higher aspect ratio. For such nucleus growth, the atmosphere preferably has the partial pressure of nitrogen in the range of 100 torrs to 10 atms. When the nitrogen partial pressure is lower than 100 torrs, $Si_3N_4$ is decomposed, and when higher than 10 atms, the anisotropical crystal growth is suppressed.

According to the present invention, at least 2 hours are required for the thermal treatment as described above, and at least 3 hours are required for the more sufficient thermal treatment including the size effect treatment of the sintered article. Further, the temperature may be continuously changed with a temperature gradient during the thermal treatment and the similar effects as described above can be achieved. In this case, the temperature gradient is preferably in the range of 2° to 5° C. per minute.

In order to form the sintered article having the matrix of the fine and uniform β-crystal particles of $Si_3N_4$ with the high aspect ratio, selection of the raw material is also important. Preferably, the raw silicon nitride powder has the average particle size of not more than 0.8 $\mu$m and the particle size distribution (3$\sigma$) of not more than 0.4 $\mu$m to form the sintered article having the desired dense micro structure. In addition, the ratio of α-crystal relative to the total amount of α- and β-crystal phases of the raw silicon nitride powder is preferably not less than 90%, more preferably not less than 95%.

When the average particle size of the raw silicon nitride is more than 0.8 $\mu$m or the particle size distribution (3$\sigma$) is more than 0.4 $\mu$m, the sintered article may have large silicon nitride particles, and in any condition, fine particles having the high aspect ratio cannot be formed and the increase of the strength cannot be achieved.

The structure of the sintered articles produced by the present process was evaluated according to a method of G. Ziegler et al, Science of Ceramics, 12, 361 (1984). A relation of the results of the above evaluation and the strength of the sintered article (according to JIS R 1601, three point bending test) is shown in the graph of FIG. 1.

Figure 2:
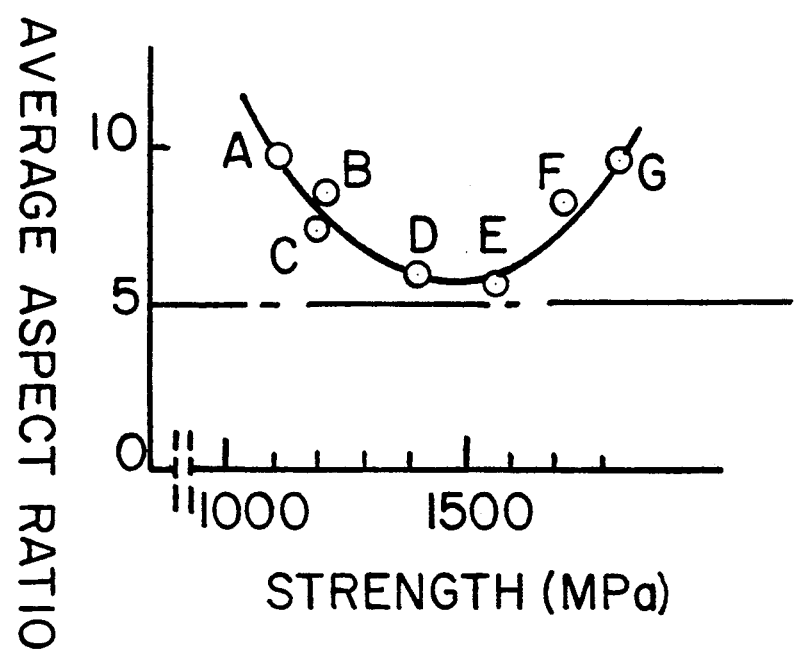
FIG. 2 is a graph showing a relation between an average aspect ratio of the crystal particle and the strength.

Further, a relation between the average aspect ratio of the sintered article and the strength is shown in the graph of FIG. 2.

It is found that the high strength sintered article of the present invention, especially one having the high strength of at least 130 Kg/mm², has the average particle size along the longitudinal axis of not more than 5 μm and the aspect ratio of not less than 5.

From the above results, it is seen that the sintered article comprising the β-crystal particles having the average major axis size of not more than 5 μm and the average aspect ratio of not less than 5 in a network structure has the larger strength than the conventional $Si_3N_4$ based material.

In addition, it is found that the sintered article according to the present invention has high reliability, that is, a high Weibull modulus (m=15 to 30), in addition to the larger strength, because of the fine and uniform crystal structure.

EXAMPLES

EXAMPLE 1

92 Percents by weight of a $Si_3N_4$ raw material which had the average particle size of 0.3 μm, the particle size distribution (3σ) of 0.25 μm, the α-crystal ratio of 97% and the oxygen content of 1.3% by weight, 4% by weight of $Y_2O_3$ powder which had the average particle size of 0.7 μm, 3% by weight of $Al_2O_3$ powder which had the average particle size of 0.4 μm and 1% by weight of AlN powder which had the average particle size of 1.1 μm were wet mixed in ethanol for 100 hours in a ball mill. Then, the powder mixture was dried and CIP (Cold Isostatic Press) shaped at a pressure of 3000 Kg/cm². The shaped article was thermally treated in a nitrogen atmosphere under a pressure of 1 atm at a temperature of 1600° C. for 4 hours and then sintered at a temperature of 1750° C. for 5 hours. The sintered article was HIP (Hot Isostatic Press) treated in a nitrogen atmosphere under a pressure of 1000 atms at a temperature of 1720° C. for 3 hours.

Test pieces (each 3 mm×4 mm×40 mm) were cut out from the obtained article and the bending strengths thereof were determined according to JIS R 1601.

Thirty test pieces were examined by the three point bending test and the average strength was 155 Kg/mm² and the Weibull modulus was 20. When a condition after the thermal treatment under the above conditions was examined with a model piece, the $\beta$-$Si_3N_4$ ratio was 90.2% and the relative density was 85%.

EXAMPLE 2

The same raw materials as in Example 1 were used and the same procedures as in Example 1 were followed except the thermal treatment and sintering conditions as shown in Table 1. The bending strengths of the sintered articles were also shown in Table 1.

EXAMPLE 3

Shaped articles produced as in Example 1 was thermally treated under the thermal treatment and sintering conditions indicated in Table 2 in a nitrogen atmosphere under a pressure of 8 atms. Then the sintered articles were HIP-treated in a nitrogen atmosphere under a pressure of 2000 atms at a temperature of 1800° C. for one hour. Thirty test pieces (each 3 mm×4 mm×40 mm) were cut out from each obtained sintered and the bending strength according to JIS R 1601 and the Weibull modulus thereof were determined.

In order to determine a volume ratio of the columnar crystal particles of $\beta$-$Si_3N_4$ in the sintered article, one sectional surface of the sintered article was lap finished and etched with an etching solution of $HF/HNO_3$ (=2/1) at a temperature of 80° C. for 30 minutes. Then, the sectional surface was observed by a scanning electron microscope at a magnification of 2500 and an area occupied by the columnar crystal particles in the observed area were measured and then the area was converted to the volume ratio of the columnar particles. The properties and the structural evaluation of the sintered articles are shown in Table 3.

In the determination of the properties, the bending strength was measured by the three point bending test according to JIS R 1601 and the fracture toughness KIC was calculated by the Evans' equation (1976) with the indentation flow method under a 10 Kg load.

TABLE 1

| Run Number | Formulation (wt %) $Y_2O_3$ | $Al_2O_3$ | AlN | Thermal Treatment °C. × Hrs | Sintering °C. × Hrs | After Thermal Treatment β Ratio (%) | Relative Density (%) | Three-Point Bending Strength (kg/mm²) | Raw $Si_3N_4$ Powder Average Size (μm) | 3σ (μm) |
|---|---|---|---|---|---|---|---|---|---|---|
| (Examples) | | | | | | | | | | |
| 1 | 5 | 2 | — | 1350 × 3 | 1800 × 5 | 86 | 87 | 115 | 0.3 | 0.3 |
| 2 | 4 | 3 | — | 1600 × 4 | 1750 × 3 | 89 | 91 | 135 | 0.5 | 0.4 |
| 3 | 3.5 | 2.5 | 1 | 1550 × 6 | 1800 × 4 | 94 | 93 | 150 | 0.4 | 0.2 |
| 4 | 3 | 2 | 1.5 | 1500 × 4 | 1850 × 3 | 90 | 90 | 146 | 0.7 | 0.2 |
| 5 | 4 | 2 | 1 | 1650 × 2 | 1750 × 4 | 92 | 92 | 112 | 0.7 | 0.35 |
| 6 | 5 | 2 | 1 | 1350 × 8 | 1800 × 2 | 88 | 89 | 135 | 0.6 | 0.25 |
| 7 | 3 | 3 | 1 | 1500 × 6 | 1900 × 2 | 91 | 94 | 142 | 0.5 | 0.35 |
| 8 | 3 | 3 | 0 | 1450 × 3 | 1800 × 6 | 86 | 90 | 153 | 0.5 | 0.3 |
| 9 | 5 | 2 | 1 | 1600 × 2 | 1700 × 8 | 91 | 92 | 149 | 0.3 | 0.3 |
| 10 | 5 | 5 | 1 | 1550 × 4 | 1850 × 4 | 94 | 92 | 145 | 0.3 | 0.2 |
| (Comparative Examples) | | | | | | | | | | |
| 11 | 4 | 3 | — | — | 1750 × 3 | — | — | 85 | 0.5 | 0.4 |
| 12 | 4 | 3 | — | 1600 × 0.5 | 1750 × 3 | 70 | 82 | 98 | 0.5 | 0.4 |
| 13 | 4 | 3 | — | 1600 × 2 | 1750 × 3 | 85 | 88 | 113 | 0.5 | 0.4 |
| 14 | 3.5 | 2.5 | 1 | 1550 × 6 | 1800 × 4 | 95 | 95 | 97 | 1.0 | 0.8 |
| 15 | 4 | 2 | 1 | 1650 × 10 | 1750 × 4 | 98 | 93 | 102 | 0.7 | 0.35 |

Note:
HIP treatment 1720° C. × 2 Hrs in nitrogen atmosphere under pressure of 1000 atms
Run Nos. 11 and 12 are comparative with Run No. 2;
Run No. 14 is comparative with Run No. 3; and
Run No. 15 is comparative with Run No. 5.

TABLE 2

| Run Number | 1st Thermal Treatment °C. × Hrs | 1st Thermal Treatment N₂ partial pressure (atm) | 2nd Thermal Treatment °C. × Hrs | 2nd Thermal Treatment N₂ partial pressure (atm) | Sintering Conditions °C. × Hrs | After Thermal Treatments β Ratio (%) | After Thermal Treatments Relative Density (%) |
|---|---|---|---|---|---|---|---|
| 1 | 1350 × 2 | 10 | 1550 × 3 | 5 | 1750 × 6 | 86 | 87 |
| 2 | 1350 × 2 | 50 | 1550 × 3 | 5 | 1750 × 6 | 87 | 89 |
| 3 | 1350 × 2 | 100 | 1550 × 3 | 5 | 1750 × 6 | 87 | 86 |
| 4 | 1350 × 2 | 10 | 1550 × 3 | 5 | 1900 × 6 | 86 | 87 |
| *5 | 1350 × 0.5 | 10 | — | — | 1750 × 6 | — | — |
| *6 | — | — | 1550 × 3 | 100 | 1750 × 6 | 80 | 75 |
| *7 | — | — | 1550 × 0.5 | 100 | 1750 × 6 | — | — |
| 8 | 1350 × 2 | 10 | 1550 × 3 | 5 | 1750 × 2 | 88 | 87 |
| 9 | 1350 × 2 | 10 | 1550 × 3 | 5 | 1900 × 2 | 88 | 87 |
| 10 | 1450 × 5 | 50 | 1600 × 5 | 1 | 1750 × 6 | 89 | 90 |
| *11 | — | — | — | — | 1750 × 6 | — | — |
| 12 | 1450 × 5 | 0.5 | 1600 × 5 | 1 | 1750 × 6 | 87 | 86 |
| *13 | — | — | 1600 × 5 | 100 | 1750 × 6 | 88 | 78 |
| 14 | 1450 × 5 | 50 | 1600 × 5 | 1 | 1900 × 6 | 89 | 90 |
| 15 | 1450 × 5 | 50 | 1600 × 5 | 1 | 1750 × 1 | 89 | 90 |
| 16 | — | — | 1600 × 5 | 1 | 1750 × 6 | 87 | 83 |
| 17 | 1450 × 5 | 50 | 1600 × 5 | 1 | 1750 × 3 | 89 | 90 |
| *18 | 1450 × 5 | 50 | 1600 × 5 | 0.1 | 1750 × 6 | 86 | 75 |
| *19 | 1450 × 0.5 | 50 | 1600 × 0.5 | 1 | 1750 × 6 | 84 | 82 |
| 20 | 1450 × 2 | 50 | 1600 × 2 | 1 | 1750 × 6 | 87 | 88 |

Note:
*means a comparative example.

TABLE 3

| Run Number | JIS Three-Point Bending Strength (Kg/mm²) | Weibull Factor | Fracture Toughness (MPa√m) | Micro Structure of Sintered Article Volume Ratio of Columnar crystal (%) | Micro Structure of Sintered Article Average Crystal Size (μm) | Micro Structure of Sintered Article Average Aspect Ratio |
|---|---|---|---|---|---|---|
| 1 | 135 | 21 | 8.8 | 21 | 3.0 | 8.3 |
| 2 | 145 | 25 | 9.2 | 24 | 3.2 | 8.5 |
| 3 | 125 | 19 | 7.3 | 20 | 3.0 | 7.2 |
| 4 | 129 | 18 | 10.5 | 28 | 4.9 | 6.3 |
| *5 | 104 | 12 | 5.7 | 14 | 6.4 | 4.7 |
| *6 | 88 | 9 | 5.2 | 12 | 5.0 | 4.3 |
| *7 | 94 | 11 | 5.6 | 12 | 5.7 | 4.4 |
| 8 | 140 | 22 | 8.2 | 20 | 2.8 | 8.4 |
| 9 | 132 | 20 | 10.3 | 25 | 4.5 | 6.0 |
| 10 | 152 | 27 | 9.0 | 23 | 2.8 | 8.8 |
| *11 | 85 | 10 | 5.3 | 10 | 4.8 | 4.2 |
| 12 | 124 | 18 | 7.8 | 21 | 3.2 | 7.0 |
| *13 | 85 | 8 | 5.3 | 11 | 5.3 | 4.3 |
| 14 | 127 | 17 | 11.4 | 27 | 4.8 | 6.5 |
| 15 | 138 | 21 | 8.2 | 21 | 2.8 | 7.2 |
| 16 | 123 | 19 | 7.0 | 19 | 3.8 | 6.2 |
| 17 | 135 | 23 | 8.5 | 22 | 3.0 | 7.6 |
| *18 | 88 | 9 | 5.2 | 12 | 5.1 | 4.2 |
| *19 | 102 | 11 | 5.4 | 14 | 4.8 | 4.0 |
| 20 | 125 | 20 | 7.2 | 20 | 3.2 | 7.3 |

Note:
*means a comparative example.

EXAMPLE 4

After 0.5% by weight of a polycarboxylic acid base deflocculant and ethanol (purity 99.9%) were added in 91% by weight of a $Si_3N_4$ raw material which was produced by the imide decomposition method and had the average particle size of 0.5 μm, the particle size distribution (3σ) of 0.30 μm, the α-crystal ratio of 98% and the oxygen content of 1.4% by weight relative to the total weight of silicon nitride raw material, and wet mixed in a ball mill with media balls made of sintered $Si_3N_4$ for 20 hours, 5% by weight of $Y_2O_3$ powder which had the average particle size of 0.7 μm, 3% by weight of $Al_2O_3$ powder which had the average particle size of 0.4 μm and 1% by weight of AlN powder which had the average particle size of 1.1 μm were added to the mixture and wet mixed in the ball mill for further 120 hours to form a slurry. The slurry was sieved with a screen having a mesh size of 10 μm to remove attrition powders from the media balls and then dried in a vacuum drier.

The dried powder was subjected to granulation by a mesh with a mesh size of 200 μm to form granules, and shaped articles (each 60 mm × 40 mm × 10 mm) were formed from the granules by CIP. The pressure of CIP was 5000 Kg/cm².

The shaped article was placed in a sintering chamber made of h-BN sintered material and evacuated at a temperature of 1000° C. for one hour. Then the article was subjected to the first thermal treatment in a nitrogen atmosphere under a pressure of 10 atms at a temperature of 1450° C. for 5 hours and subsequently to the second thermal treatment in a nitrogen atmosphere under a pressure of 1 atm at a temperature of 1600° C. for 5 hours.

The relative density and the β-crystal ratio of the thermally treated article were 90% and 88%, respectively. The thermally treated article was sintered in a nitrogen atmosphere under a pressure of 5 atms at a temperature of 1750° C. for 5 hours, and further in a nitrogen atmosphere under a pressure of 100 atms at a temperature of 1850° C. for 2 hours. The sintered article was cut into test pieces each having a size of 3 mm×4 mm×40 mm and the three point bending strength of each test piece was determined according to JIS R 1601.

With respect to the thirty test pieces, the average strength was 140 Kg/mm² and the Weibull modulus was 22.

EXAMPLE 5

The first and the second thermal treatments and the sintering step as in Example 4 were carried out continuously to form a sintered article. The bending strength and the Weibull factor were determined as in Example 4, and they were 150 Kg/mm² and 25, respectively.

EXAMPLE 6

When the $Si_3N_4$ powder used in Example 4 was thermally treated in the air at a temperature of 700° C. for 10 hours, the oxygen content increased to 1.8% by weight. This powder and the powder without such thermal treatment were used to form sintered articles in the same manner as in Example 4. The properties and the micro structure of the resulted articles were evaluated as in Example 3. The results are as follows:

| With use of powder without thermal treatment | |
|---|---|
| Average bending strength | 140 Kg/mm² |
| Weibull modulus | 22 |
| Volume ratio of columnar crystal particles | 21% |
| Average crystal particle size | 3.4 μm |
| Average aspect ratio | 8.5 |
| With use of powder with thermal treatment | |
| Average bending strength | 155 Kg/mm² |
| Weibull modulus | 26 |
| Volume ratio of columnar crystal particles | 25% |
| Average crystal particle size | 3.2 μm |
| Average aspect ratio | 9.8 |

As described above, the present process provides the sintered $Si_3N_4$ article having the much larger strength than the conventional article.

What is claimed is:

1. A process for the production of a sintered article containing $\beta$-$Si_3N_4$ particles of not less than 15% by volume. relative to all $\beta$-silicon nitride, which have a major axis size of not more than 5 μm and an aspect ratio of not less than 5, comprising the steps of:
   (a) shaping a raw material powder comprising silicon nitride of which $\alpha$-$Si_3N_4$ powder content is not less than 90% into a shaped article,
   (b) thermally treating the shaped article in a non-oxidizing atmosphere for at least 2 hours to form $\beta$-$Si_3N_4$ of not less than 85% calculated from X-ray diffraction patterns according to equation (I) and an increase a relative density of the article is not less than 80%, and
   (c) sintering the shaped article, after the thermal treatment;
   wherein the $\alpha$-$Si_3N_4$ powder has an average particle size of not more than 0.8 μm and a particle size distribution (3$\sigma$) of not more than 0.4 μm;
   and wherein the non-oxidizing atmosphere applied during thermal treatment comprises at least one of:
   (i) a nitrogen atmosphere under a pressure of 1 to 100 atms at a temperature of 1300° to 1500° C.; and
   (ii) a nitrogen atmosphere under a pressure of 100 torrs to 10 atms at a temperature of 1450° to 1600° C.;
   and wherein the non-oxidizing atmosphere applied in the sintering comprises a nitrogen atmosphere under a pressure of 1 to 100 atms at a temperature of 1700° to 2000° C.

2. The process according to claim 1 wherein, before shaping the article, the $Si_3N_4$ powder is oxidized in air at a temperature of up to 800° C. for 2 to 5 hours to form at least one of $SiO_2$ and $Si_2N_2O$ on powder surfaces of which amount corresponds to an amount of surface oxygen of from 1.5 to 2.5% by weight relative to a total weight of the $Si_3N_4$ powder.

* * * * *